United States Patent [19]
Townsend

[11] Patent Number: 5,264,298
[45] Date of Patent: Nov. 23, 1993

[54] LEWIS ACID THERMOELECTROCHEMICAL CONVERTER

[75] Inventor: Carl W. Townsend, Los Angeles, Calif.

[73] Assignee: Hughes Aircraft Company, Los Angeles, Calif.

[21] Appl. No.: 963,296

[22] Filed: Oct. 19, 1992

[51] Int. Cl.$^5$ .............................................. H01M 8/06
[52] U.S. Cl. ...................................... 429/17; 429/20; 429/102
[58] Field of Search ............... 429/20, 17, 19, 11, 429/26, 120, 101–103, 29, 46

[56] References Cited
U.S. PATENT DOCUMENTS 3,253,955  5/1966  Clampitt et al. ................... 429/11
3,536,530 10/1970  Anthes et al. .................... 429/20 X
3,554,807  1/1971  Kellner ............................ 429/11
4,292,378  9/1981  Krumpelt et al. ................ 429/20 X
4,738,904  4/1988  Ludwig et al. ................... 429/17

Primary Examiner—Anthony Skapars
Attorney, Agent, or Firm—M. E. Lachman; M. W. Sales; W. K. Denson-Low

[57] ABSTRACT

A thermoelectrochemical converter useful for generating electrical potential by converting heat into electricity. A liquid metal cathode is placed in contact with a liquid Lewis acid catholyte, and a liquid metal anode is placed in contact with a liquid Lewis base anolyte. Anolyte and catholyte reactants consumed at the anode and cathode during the electrochemical reaction are directly regenerated thermally and recycled to the anode and cathode to replenish the consumed anolyte and catholyte.

18 Claims, 1 Drawing Sheet

LEWIS ACID THERMOELECTROCHEMICAL CONVERTER

This invention was made with Government support under Contract Number N00014-89-C-0071 awarded by the Department of the Navy. The Government has certain rights in this invention.

BACKGROUND OF THE INVENTION

1. Field of the Invention

The present invention relates generally to thermoelectrochemical converters useful for converting thermal energy into electrical energy. More particularly, the present invention involves electrochemical cells wherein a Lewis acid and Lewis base react to produce electrical potential and a Lewis salt which is then thermally decomposed to regenerate the acid and base.

2. Description of Related Art

Thermally regenerated electrochemical systems have been investigated extensively since the late 1950's. In these systems, the working substances utilized in an electrochemical cell to generate electrical current are regenerated by providing thermal energy to the products of the electrochemical reactions. Typically, these products decompose to reform the working substances, or the elevated temperature provides heat for distillation columns to separate liquid components from solid components. These systems are similar to secondary batteries in many respects except that regeneration of the electrochemically active reactants is accomplished thermally rather than electrically.

Thermally regenerated fuel cell systems which are based upon the oxidation and reduction of hydrogen have gained wide acceptance because hydrogen electrodes are very efficient. Such electrodes are capable of supporting reasonably high current flow and they are well known in the industry. Additionally, the low activation and low mass low transfer losses of these electrodes contribute substantially to overall system efficiency. Representative fuel cells which utilize hydrogen electrodes are described in U.S. Pat. No. 4,738,904 which is assigned to the same assignee as the present invention.

Among other systems which are described in U.S. Pat. No. 4,738,904 is a fuel cell using oxygen electrodes and having a cathode electrolyte of concentrated sulfuric acid and an anode electrolyte of dilute sulfuric acid. The difference in acid concentration between the two solutions is maintained by heating the concentrated solution to distill off water generated at the cathode. A disadvantage associated with thermoelectrochemical systems that use the distillation process is that they require bulky equipment and the need to circulate large amounts of water. Additionally, aqueous based systems require an external system for returning hydrogen from the cathode to the anode. This external return system makes the fuel cell more complex and is prone to leaks. A preferred method for transferring the hydrogen from the cathode to the anode is through a porous cell separator. However, the low surface tension in aqueous systems allows electrolyte to flood the pores of these porous separators.

Another system described in U.S. Pat. No. 4,738,904 is an improvement to the fuel cell described immediately above, in which a buffered solution containing sodium sulfate and sodium bisulfate is substituted for the dilute acid. During operation, sodium bisulfate is generated at the anode and sodium sulfate is consumed. For regeneration, the sodium bisulfate is thermally converted to sodium sulfate, water, and sulfur trioxide. The sulfur trioxide is combined with water to regenerate sulfuric acid. This system has the advantage of generating electrical energy without requiring distillation. However, this system does require hydrogen gas containment and transfer lines.

The thermally regenerated fuel cell disclosed in U.S. Pat. No. 4,738,904 utilizes a fluid Bronsted acid and a fluid Bronsted base in the cathode and anode respectively. The anion of the acid combines with the cation of the base to form a salt which is thermally regenerated at temperatures below 250° C. This system, however, has high electrolyte resistance and for most applications inert solvents are required.

Although the above-described fuel cells are well suited for their intended uses, there is a continuing need to provide thermoelectrochemical converters having solventless reactants.

There is also a continuing need to provide thermoelectrochemical converters which do not require the removal of inert solvents by energy-consuming fractional distillation techniques.

There is further a continuing need to provide thermoelectrochemical converters which avoid the need for hydrogen gas containment reservoirs and hydrogen gas transportation and return systems.

There is additionally a continuing need for high efficiency thermoelectrochemical converters which are capable of thermally regenerating the working electrolytes and which produce electrical energy from the waste heat of an internal combustion engine.

There is also a need to provide thermoelectrochemical converters with low internal resistance and high electrolyte conductivity.

SUMMARY OF THE INVENTION

The present invention provides thermoelectrochemical converters and methods for generating electric power in electrochemical cells which are based upon one or more highly conductive liquid electrolytes. The liquid anolytes and catholytes utilized in the thermoelectrochemical converters of the present invention obviate any requirement f or inert electrolyte solvents and fractional distillation procedures. Advantageously, the thermoelectrochemical converters of the present invention are based upon Lewis acid chemistry and accordingly avoid the use of hydrogen gas and hydrogen gas make-up reservoirs. Additionally, the Lewis acid electrochemical converters of the present invention allow the use of liquid metal electrodes which are easily contained and stored.

An exemplary thermoelectrochemical system of the present invention includes an electrochemical cell having a cathode compartment and an anode compartment which are separated by an ion-conducting separator. An anode of liquid metal and a cathode of liquid metal are located in the anode compartment and the cathode compartment, respectively. The cathode and anode are connectable externally from the system for generation of an electrical voltage and current between the electrodes.

A Lewis acid catholyte is disposed within the cathode compartment in contact with the cathode. During operation of the system, a liquid metal and a salt of the Lewis acid are generated and the Lewis acid is consumed. The system further includes a Lewis base anolyte disposed within the anode compartment in contact with the anode. During operation, the Lewis base anolyte and liquid metal are consumed at the anode to form a salt and electrical potential. In order to replenish the anode with consumed liquid metal, the system is provided with an electrically discontinuous line for transporting liquid metal from the cathode to the anode. The ion-conducting separator contributes to electroneutrality within the electrochemical cell by allowing ionic species to migrate between the anode compartment and the cathode compartment.

A thermal regenerator for thermally converting salt generated in the anode compartment to the Lewis acid catholyte and the Lewis base anolyte is connected to the anode compartment by a transfer line for transferring the salt from the anode compartment to the thermal regenerator. An anode recycling system is positioned external to the electrochemical cell for transferring the Lewis base anolyte formed in the thermal regenerator to the anode compartment, thereby replenishing the consumed Lewis base. Similarly, a cathode recycling system is positioned external to the electrochemical cell for transferring the Lewis acid catholyte formed in the thermal regenerator to the cathode compartment, thereby replenishing the consumed Lewis acid catholyte.

These and many other features and attendant advantages of the present invention will become apparent as the invention becomes better understood by reference to the following detailed description when considered in conjunction with the accompanying drawing.

DESCRIPTION OF THE PREFERRED EMBODIMENTS

Figure 1:
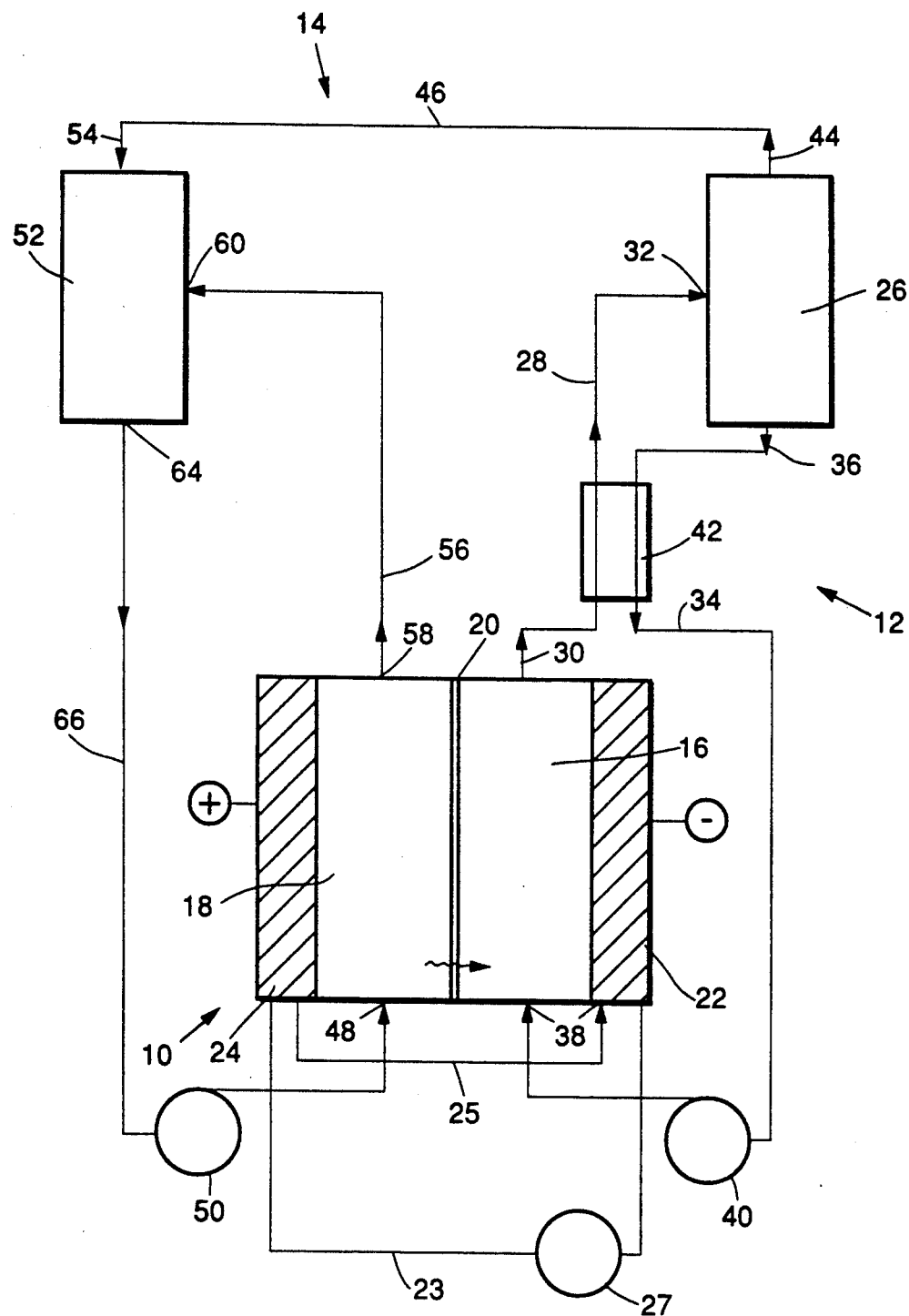
FIG. 1 is a diagrammatic representation of a thermoelectrochemical converter in accordance with the present invention.

A preferred exemplary thermoelectrochemical converter of the present invention is illustrated in FIG. 1. The basic thermoelectrochemical system includes an electrochemical cell 10, a thermal generator 12 and recycling system 14. As a feature of the present invention, the electrochemical cell uses Lewis acid and Lewis based liquid reactants and has no volatile solvents which can detract from the thermoelectrochemical converter's efficiency and power density. The term "Lewis acid" is used herein to have its accepted meaning of any compound that can accept an electron pair and "Lewis base" is used herein to mean any compound which can donate an electron pair.

Since protonic acids are not involved in the cell reaction, the thermoelectrochemical converter does not require undesirable hydrogen gas transfer lines and hydrogen make-up reservoirs which are difficult to contain. Additionally, the liquid Lewis acids and Lewis bases have high conductivities, which contribute to high electrochemical cell current densities. Useful applications for the thermoelectrochemical converters of the present invention include, but are not limited to, high temperature thermally regenerative systems such as spacecraft power supplies and electric generation systems for electric vehicle propulsion.

Referring to FIG. 1, the thermoelectrochemical converter of the present invention includes an electrochemical cell 10 having an anode compartment 16 and a cathode compartment 18. An ion-conducting separator 20 forms a wall between the anode compartment 16 and the cathode compartment 18. The ion-conducting separator 20 can be any ion-permeable membrane or other porous material membrane conventionally utilized in electrochemical cells to allow ion communication between the anode compartment and the cathode compartment. Suitable separators include microporous membranes, cation exchange membranes and anion exchange membranes. Ion-permeable membranes include, for example, conventional microporous polymer battery separators of hydrophilic microporous polypropylene. Cation exchange membranes include those fabricated of Nafion, a polytetrafluoroethylene having fluorinated ether side chains terminated with sulfonic acid groups, available from E. I. DuPont de Nemours of Wilmington, Del. Suitable anion exchange membranes are alkali-resistant copolymers of vinylchloride and acrylonitrile with quaternary nitrogen groups, available from Ionics, Inc. of Watertown, Mass.

The electrochemical cell further incorporates an electrode pair which includes an anode 22, located in the anode compartment 16, and a cathode 24, located in the cathode compartment 18. Both the anode 22 and the cathode 24 are fabricated of a suitable metal which is liquid at the operating temperatures of the cell. The liquid metal at anode 22 is consumed during the electrochemical cell reactions, and liquid metal is generated at cathode 24. In order to replenish anode 22 with liquid metal to replace the consumed liquid metal, anode 22 and cathode 24 are connected by an electrically discontinuous transfer line 25 for transporting liquid metal generated at cathode 24 to anode 22. Electrodes 22 and 24 are connectable to an external circuit, shown at 23 for supplying an electrical current to an external electrical device 27. The device 27 included in circuit 23 can incorporate electric motors or similar devices benefitted by the electric energy generated by electrochemical cell 10. Among these devices are storage systems such as batteries which allow the thermoelectrochemical system to operate during periods when no heat input is available to the thermal regenerator.

A Lewis acid catholyte is located in the cathode compartment 18 and in contact with cathode 24, and a Lewis base anolyte is located in the anode compartment 16 and in contact with anode 22. The Lewis acid catholyte and the Lewis base anolyte form an addition salt which can be thermally decomposed to regenerate the Lewis acid and the Lewis base. Another characteristic of the catholyte and anolyte involves their respective chemical reactivities with the cathode and anode. More particularly, the electrical voltage generated within electrochemical cell 10 is due to the difference in the reactivities between the anode and Lewis base and the cathode and Lewis acid.

In accordance with the present invention, any Lewis acid has potential utility as an anolyte. Important considerations in choosing a Lewis acid catholyte are its melting point or the temperature at which it is fluid, its fluid conductivity, and its reactivity with the cathode. Suitable Lewis acid anolytes are sodium heptachlorogallate ($NaGa_2Cl_7$) gallium chloride ($GaCl_3$), gallium bromide ($GaBr_3$), and gallium iodide ($GaI_3$).

Similarly, Lewis bases in general have utility in the practice of the present invention and the selection of the Lewis base is dependent upon its reactivity, its fluid forming temperature, and the decomposition temperature of the salt which forms from its addition with the selected Lewis acid. Suitable Lewis bases which can be utilized in combination with selected Lewis acids mentioned above include sodium chloride (NaCl), sodium bromide (NaBr), sodium iodide (NaI), potassium chloride (KCl), potassium bromide (KBr), potassium iodide (KI), and low melting bases such as 1-methyl-3-ethylimidazolium chloride and butylpyridinium chloride.

An additional consideration in selecting a Lewis acid catholyte and a Lewis base anolyte is that the addition salt of the acid and base should be sufficiently heat stable to allow thermal regeneration of the acid and base. While salts which decompose at lower temperatures than the regeneration temperature are suitable for the electrochemical generation of electrical potential, they are less preferred for thermoelectrochemical converters.

Any of the above mentioned Lewis acids and Lewis bases can be used in combination with liquid gallium electrodes. When Lewis acids such as aluminum chloride ($AlCl_3$), aluminum bromide ($AlBr_3$) or aluminum iodide ($AlI_3$) are adopted for use in the electrochemical cell, liquid aluminum anodes and liquid aluminum cathodes are used. Amalgamating the aluminum with mercury results in a liquid aluminum mixture suitable for forming electrodes which are liquid instead of solid. Other weaker acids such as zinc chloride or tin chloride can be used with zinc or tin electrodes, respectively.

In accordance with the present invention, a preferred electrochemical cell utilizes a Lewis acid catholyte of sodium heptachlorogallate and a Lewis base anolyte of NaCl. The electrochemical cell reactions involve chemical activity between the sodium heptachlorogallate and a liquid gallium cathode and chemical activity between the NaCl and a liquid gallium anode. A voltage develops due to the difference in gallium activity in the catholyte and anolyte.

At the cathode the heptachlorogallate is consumed during the generation of electrical potential in the following reaction:

$$3\,Na^+ + 3e^- + 4\,NaGa_2Cl_7 \rightarrow 7\,NaGaCl_4 + Ga$$

At the anode the Lewis base is consumed during the generation of electrical potential in the following reaction:

$$Ga + 4\,NaCl \rightarrow NaGaCl_4 + 3\,Na^+ + 3e^-$$

To maintain electrical neutrality within the electrochemical cell, chlorogallate ions ($GaCl_4^-$) or sodium ions ($Na^+$) migrate through ion-conducting separator 20 in the electrochemical cell 10. Preferably the ion-conducting separator 20 is an anion exchange membrane which limits the migration to only chlorogallate ions ($GaCl_4^-$) and provides the electrochemical cell with greater thermal efficiency.

In order to thermally convert the salt formed in anode compartment 16 directly to the Lewis acid catholyte and the Lewis base anolyte for further consumption in the electrochemical cell 10, the thermoelectrochemical converter of the present invention further includes a thermal regenerator shown at numeral 26 in FIG. 1. Suitable thermal regenerators 26 include any heat source such as boilers or furnaces which provide sufficient heat and temperatures to decompose the salt and regenerate the Lewis acid and Lewis base. Transfer line 28 is available for transferring the Lewis base addition salt from anode compartment output 30 to thermal regenerator input 32.

An anode recycle system which includes a transfer line 34 is available for transferring the Lewis base anolyte regenerated in thermal regenerator 26 through output 36 to anode compartment input 38 for replenishing the anolyte in anode compartment 16. Pump 40 provides power for moving the salt and the thermally regenerated Lewis base anolyte through the system.

The thermoelectrochemical converter of the present invention preferably includes a counter-current heat exchanger 42 wherein the thermally regenerated Lewis base anolyte in line 34 transfers heat to the Lewis base addition salt being transferred in line 28.

Further and in accordance with the present invention, the thermoelectrochemical converter includes a cathode recycle line 46 for transferring Lewis acid thermally regenerated in thermal regenerator 26 through output 44 and to cathode compartment input 48. Pump 50 provides the power for pumping the regenerated Lewis acid through recycle line 46.

In preferred embodiments in which sodium heptachlorogallate ($NaGa_2Cl_7$) is the Lewis acid catholyte and NaCl is the selected Lewis base anolyte, the catholyte recycle system further incorporates a condenser 52, for condensing gaseous gallium chloride ($GaCl_3$), the Lewis acid formed in thermal regenerator 26. The gallium chloride is transferred from thermal regenerator 26 in line 46 through condenser input 54 and into condenser 52 where the gallium chloride combines with liquid sodium chlorogallate ($NaGaCl_4$) to form the Lewis acid catholyte, liquid sodium heptachlorogallate ($NaGa_2Cl_7$) in the following reaction:

$$GaCl_{3(g)} + NaGaCl_{4(l)} \rightarrow NaGa_2Cl_{7(l)}$$

In accordance with the present invention, and in order to make liquid sodium chlorogallate ($NaGaCl_4$) available for the above-described reaction in condenser 52, a preferred thermoelectrochemical converter includes transport line 56 for moving sodium chlorogallate from cathode compartment 18. The liquid sodium chlorogallate moves from cathode compartment 18, through cathode compartment output 58 via line 56 and into condenser 52 through condenser input 60. Transport line 66 is incorporated in the thermoelectrochemical system for transferring the sodium heptachlorogallate formed in condenser 52 to cathode compartment 18. In operation, the liquid sodium heptachlorogallate moves from condenser 52 through condenser output 64, via transport line 66, and into cathode compartment 18 through cathode compartment input 4 8. Pump 50 is provided for pumping the liquid Lewis acid catholyte from condenser 52 to cathode compartment 18.

Additional components of the electrochemical cell 10 include current collectors (not shown) which form a connection between the electrodes 22 and 24 and external circuit 23. The current collectors are typically fabricated from non-reactive conductive materials which freely allow the anolyte and catholyte to penetrate the anode and cathode. Suitable materials are gold-plated stainless steel screen.

The operating temperature of the thermoelectrochemical converter of the present invention, including the temperature of the catholyte and anolyte, is preferably just high enough to maintain the anolyte, catholyte and the electrodes in a molten liquid state. If heat input is required to maintain the molten state, the heat can be transferred from a source external to the electrochemical cell or the cell can be located within the environment of the heat source. Similarly, heat can be transferred from an external source to the thermal regenerator for thermally regenerating the Lewis acid and Lewis base.

The electrochemical cell which forms part of the thermoelectrochemical converter of the present invention can be used for short term applications or for one-time use in which the electrochemical cell is discharged by the consumption of the Lewis base anolyte and/or Lewis acid catholyte. Such an application does not require the use of a thermal regenerator since the catholyte and anolyte are not intended to be continuously available. The preferred use, however, for the electrochemical cell described above is in a system in which a continuous electrical current is generated and the anolyte and catholyte are directly regenerated thermally and then recycled to the anode compartment and cathode compartment respectively.

The heat input required for supplying heat to the thermal regenerator 26 in order to regenerate the catholyte and anolyte, and the heat required for operating the electrochemical cell 10 can be provided by a number of different heat sources. It is desirable that the heat input be provided from the waste heat of a system external to the electrochemical cell such as internal combustion engines or oil well heads. Additional sources include geothermal heat, solar collectors, and low grade waste heat generated in various industrial processes.

Although the thermoelectrochemical converter of the present invention has been described for a single electrochemical cell, it should be noted that a complete system would preferably consist of many cells and electrode pairs stacked and manifolded in series or parallel arrangements. In these multicell stacks, the liquid metal produced at the cathode is conveniently transported through a porous wall to the adjacent anode compartment. These stacked cells arrangements provide increased energy and current densities and additionally allow the thermoelectrochemical converters to be readily modified to adapt to either large or small energy systems.

The following non-limiting example describes the operation of an electrochemical cell of the present invention.

EXAMPLE 1

In order to demonstrate the feasibility of generating electrical potential in an electrochemical cell which utilizes a Lewis acid catholyte and a Lewis base anolyte, an electrochemical cell was assembled and operated as follows. A type R-1030 anion-conducting membrane available from Pall RAI of Hauppauge, N.Y., was clamped vertically between two halves of a split 5 mL Teflon cup, forming an anode compartment and a cathode compartment. A 1 ML pool of gallium metal was placed in the bottom of each of the two cup halves and platinum wires were passed though each side of the cup and placed in contact with each 1 mL pool of gallium. Mixtures of gallium chloride (a Lewis acid) and 1-methyl-3-ethylimidazolium chloride (a Lewis base) having different ratios of the Lewis acid and Lewis base were placed in the anode compartment and the cathode compartment. Then, the cell voltage which developed from the difference in the gallium reactivity within the anode compartment and the cathode compartment was measured. All tests were carried out in an inert atmosphere.

The measured voltages (EMF) for three tests at different ratios of gallium chloride and 1-methyl-3-ethylimidazolium chloride are illustrated in Table I.

TABLE I

| Measured EMF of $GaCl_3$ Electrochemical Cell | | |
|---|---|---|
| Mole % $GaCl_3$ in Anode compartment | Mole % $GaCl_3$ in Cathode Compartment | Cell EMF, Volts |
| 26 | 86.2 | 2.07 |
| 40 | 86.1 | 1.75 |
| 60 | 86.2 | 0.63 |

The Lewis base 1-methyl-3-ethylimidazolium chloride was selected for its low melting point which allowed the experiments to be carried out at ambient temperatures. The Lewis acid-Lewis base addition salt which formed during these experiments, 1-methyl-3-ethylimidazolium chlorogallate, is not susceptible to thermal treatment for regenerating the gallium chloride and 1-methyl-3-ethylimidazolium. This is due to the low decomposition temperature associated with the organic cation which would decompose before the regeneration temperature is reached. However, it is known that the sodium chloroaluminate analog has a sufficient vapor pressure at 500° C. to effect the required thermal regeneration. Furthermore, in view of the chemical similarity of sodium chloroaluminate and sodium chlorogallate to 1-methyl-3-ethylimidazolium chlorogallate, it is reasonable and predictable to conclude that a closed loop thermoelectrochemical converter and process can be constructed. Such a closed loop thermoelectrochemical converter includes the electrochemical cell and a system for effectively thermally regenerating the electrochemical cell reactants.

Having described exemplary embodiments of the present invention, it should be noted by those skilled in the art that the within disclosures and the formulations in the above example are exemplary only and that various other alternatives, adaptations and modifications may be made within the scope of the present invention. Accordingly, the present invention is not limited to the specific embodiments as illustrated herein, but is only limited to the following claims.

What is claimed is:
1. A system for generating electric current from an anolyte and a catholyte and regenerating said anolyte and said catholyte, said system comprising:
   (a) an electrochemical cell comprising:
      an anode compartment and a cathode compartment, said cathode compartment and said anode compartment being separated by an ion-conducting separator;
      an anode comprising liquid metal located in said anode compartment;
      cathode comprising liquid metal located in said cathode compartment, said anode and said cathode being connected by an electrically discontinuous means for transporting liquid metal generated at said cathode to said anode for consumption, and said cathode and said anode being connectable to a conductive external circuit;
      a Lewis acid catholyte located in said cathode compartment and in contact with said cathode, wherein said catholyte is consumed and liquid metal is generated during generation of said electrical current;
      a Lewis base anolyte located in said anode compartment and in contact with said anode wherein said Lewis base anolyte and said liquid metal combine to form a salt during generation of said electrical current;

(b) thermal regenerator means for thermally converting said salt directly to said Lewis acid catholyte and said Lewis base anolyte;

(c) means for transferring said salt from said anode compartment to said thermal regenerator means;

(d) anode recycle means for transferring said Lewis base anolyte formed in said thermal regenerator to said anode compartment to replenish said Lewis base anolyte consumed during generation of said electrical current; and (e) cathode recycle means for transferring said Lewis acid catholyte formed in said thermal regenerator to said cathode compartment to replenish said acid consumed during generation of said electrical current.

2. A system according to claim 1 wherein said ion-conducting separator is an anion exchange membrane.

3. A system according to claim 1 wherein said Lewis base -anolyte is selected from the group consisting of sodium chloride, sodium bromide, sodium iodide, potassium chloride, potassium bromide, potassium iodide, 1-methyl-3-ethylimidazolium chloride, and butylpyridinium chloride.

4. A system the according to claim 3 wherein said Lewis acid catholyte is selected from the group consisting of gallium chloride, gallium bromide, gallium iodide, sodium heptachlorogallate, aluminum chloride, aluminum bromide, aluminum bromide, zinc chloride and tin chloride.

5. A system according to claim 1 wherein said Lewis acid is sodium heptachlorogallate, said Lewis base is NaCl, said anode and said cathode are each liquid gallium, and said thermal regenerator converts sodium chlorogallate to gallium chloride and NaCl.

6. A system according to claim 5 wherein said cathode recycle means includes means for transporting said gallium chloride to a condenser means wherein said gallium chloride reacts with sodium chlorogallate to form sodium heptachlorogallate.

7. A system according to claim 6 further including a sodium chlorogallate transport means for transferring sodium chlorogallate from said anode compartment to said condenser means.

8. The system according to claim 1 wherein heat input is provided to said thermal regenerator means and comprises heat selected from sources consisting of an internal combustion engine and an oil well head.

9. A process for generating electrical current between an anode and a cathode from a heat input, said process comprising the steps of:

(a) contacting a liquid metal cathode with a liquid catholyte comprising a Lewis acid, said cathode and liquid catholyte being located in a cathode compartment having an ion-permeable separator in common with an anode compartment;

(b) contacting a liquid metal anode with a liquid anolyte in said anode compartment, said liquid anolyte comprising a Lewis base, said liquid metal anode and said liquid metal cathode being connectable with an external conductive circuit, and wherein;

(i) said Lewis acid is consumed and liquid metal is generated at said cathode, and said Lewis base and liquid metal are consumed and a cation of said Lewis base is generated at said anode during generation of said electrical current; and (ii) an anion of said Lewis acid or a cation of said Lewis base migrates through said ion-permeable separator and forms a salt of said Lewis acid and said Lewis base;

(c) removing said salt from said anode compartment and said cathode compartment;

(d) thermally converting said salt to said liquid Lewis acid and said liquid Lewis base;

(e) transferring said thermally generated liquid Lewis base to said anode compartment to replenish said Lewis base consumed during generation of said electric current; and (f) transferring said thermally converted liquid Lewis acid to said cathode compartment to replenish said Lewis acid consumed during generation of said electric current.

10. A process for generating electrical current according to claim 9 wherein said ion-permeable separator comprises an anion exchange membrane, and said anion of said Lewis acid migrates across said anion exchange membrane from said cathode compartment to said anode compartment.

11. A process for generating electrical current according to claim 9 wherein said liquid metal generated at said cathode is transferred from said cathode compartment to said anode compartment.

12. A process for generating electrical current according to claim 9 wherein said liquid anolyte is sodium chloride, said liquid catholyte is sodium heptachlorogallate, and said salt is sodium chlorogallate.

13. A process for generating electrical current according to claim 12 further including the step of:

transferring thermally converted gaseous gallium chloride to a condenser for forming cooled gallium chloride; and transferring liquid sodium chlorogallate from said cathode compartment to said condenser, wherein said cooled gallium chloride and said liquid sodium chlorogallate combine to form liquid sodium heptachlorogallate.

14. A process for generating electrical current according to claim 12 wherein said transferring said thermally converted liquid Lewis acid to said cathode compartment comprises transferring liquid sodium heptachlorogallate from said condenser to said cathode compartment.

15. An electrochemical cell for generating electrical current, said cell comprising:

an anode compartment and a cathode compartment, said cathode compartment and said anode compartment being separated by an ion-conducting separator;

an anode comprising liquid metal located in said anode compartment;

a cathode comprising liquid metal located in said cathode compartment, said anode and said cathode being connected by an electrically discontinuous means for transporting liquid metal generated at said cathode to said anode for consumption, and said cathode and said anode being connectable to a conductive external circuit;

a Lewis acid catholyte located in said cathode compartment and in contact with said cathode, wherein said catholyte is consumed and liquid metal is generated during generation of said electrical current; and a Lewis base anolyte located in said anode compartment and in contact with said anode wherein said Lewis base anolyte and said liquid metal combine to form a salt during generation of said electrical current.

16. An electrochemical cell according to claim 15 wherein said ion-conducting separator is an anion exchange membrane.

17. An electrochemical cell according to claim 15 wherein said Lewis base anolyte is selected from the group consisting of sodium chloride, sodium bromide, sodium iodide, potassium chloride, potassium bromide, potassium iodide, 1-methyl-3-ethylimidazolium chloride, and butylpyridinium chloride.

18. An electrochemical cell according to claim 15 wherein said Lewis acid catholyte is selected from the group consisting of gallium chloride, gallium bromide, gallium iodide, sodium heptachlorogallate, aluminum chloride, aluminum bromide, aluminum bromide, zinc chloride, and tin chloride.

* * * * *